United States Patent [19]

Ravizza et al.

[11] 4,151,570
[45] Apr. 24, 1979

[54] AUTOMATIC SCAN TRACKING USING A MAGNETIC HEAD SUPPORTED BY A PIEZOELECTRIC BENDER ELEMENT

[75] Inventors: Raymond F. Ravizza, Cupertino; James R. Wheeler, Belmont, both of Calif.

[73] Assignee: Ampex Corporation, Redwood City, Calif.

[21] Appl. No.: 669,047

[22] Filed: Mar. 22, 1976

[51] Int. Cl.² .................. G11B 21/10; G11B 5/52; G11B 21/18

[52] U.S. Cl. .................. 360/77; 360/107; 360/109

[58] Field of Search .................. 360/77, 75, 108, 109, 360/71, 113, 70, 107, 105; 310/26, 8, 8.5, 9, 9.1, 9.6, 330–332, 326–327

[56] References Cited

U.S. PATENT DOCUMENTS

| | | | |
|---|---|---|---|
| 3,126,535 | 3/1964 | Streeter | 360/77 |
| 3,155,830 | 11/1964 | Knight | 250/201 |
| 3,263,031 | 7/1966 | Welsh | 360/77 |
| 3,501,586 | 3/1970 | Russell | 250/219 |
| 3,526,726 | 9/1970 | Corbett et al. | 360/113 |
| 3,544,718 | 12/1970 | Adler | 178/69.5 |
| 3,778,560 | 12/1973 | Precin et al. | 360/107 |

FOREIGN PATENT DOCUMENTS

| | | | |
|---|---|---|---|
| 49-20208 | 5/1974 | Japan | 360/77 |
| 49-84617 | 8/1974 | Japan | 360/77 |
| 52-43362 | 10/1977 | Japan | 360/77 |

*Primary Examiner*—Alfred H. Eddleman
*Attorney, Agent, or Firm*—Robert G. Clay; Ralph L. Mossino

[57] ABSTRACT

A magnetic head, rotating at high speed in a reproduce relationship with a magnetic tape, is supported on the free end of a piezoelectric bender element. The bender element is caused to vibrate between two limits at a fixed frequency (dither) to determine the instantaneous position of the magnetic head relative to a track of data recorded along the tape. A feedback servo provides continuous adjustment of the position about which the transducer is vibrated so as to maintain the magnetic head in an optimum reproduce relationship with respect to the track.

27 Claims, 8 Drawing Figures

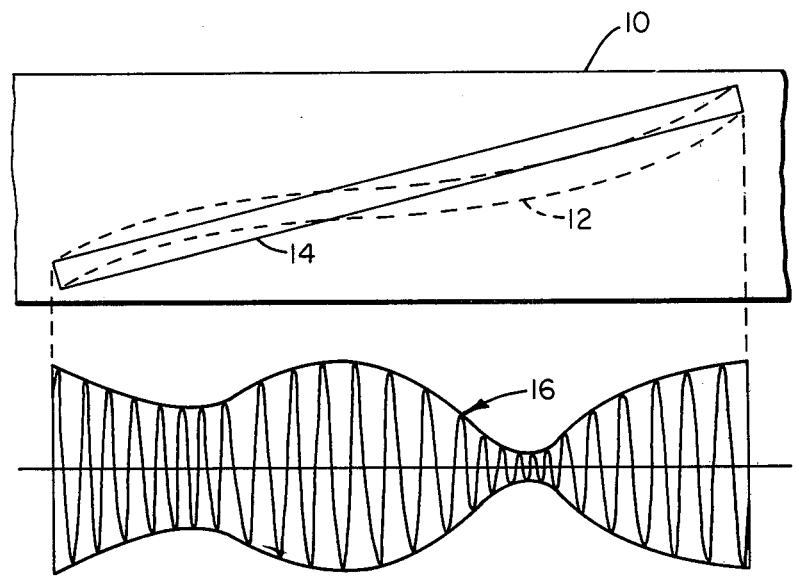
FIG_1
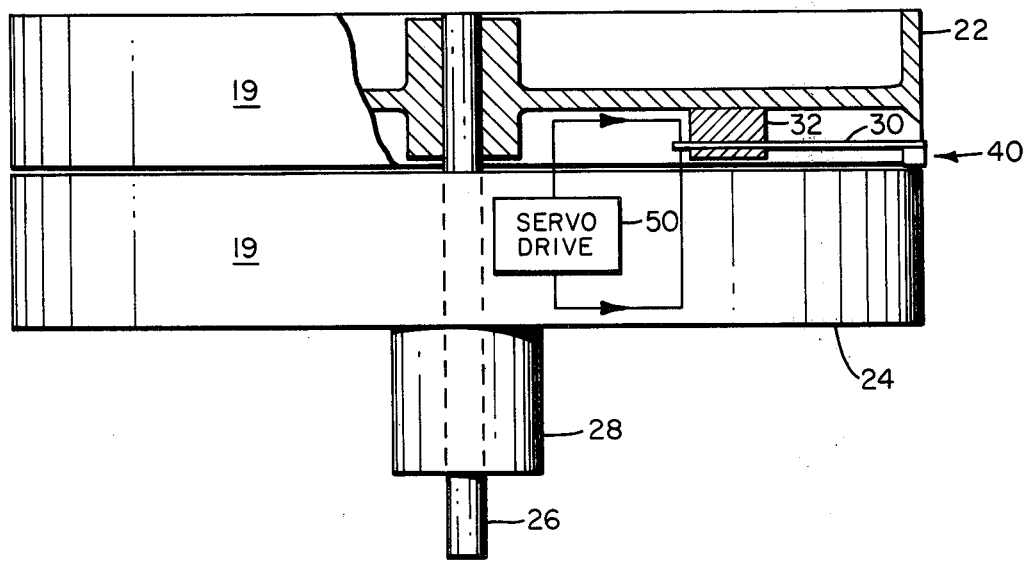
FIG_2

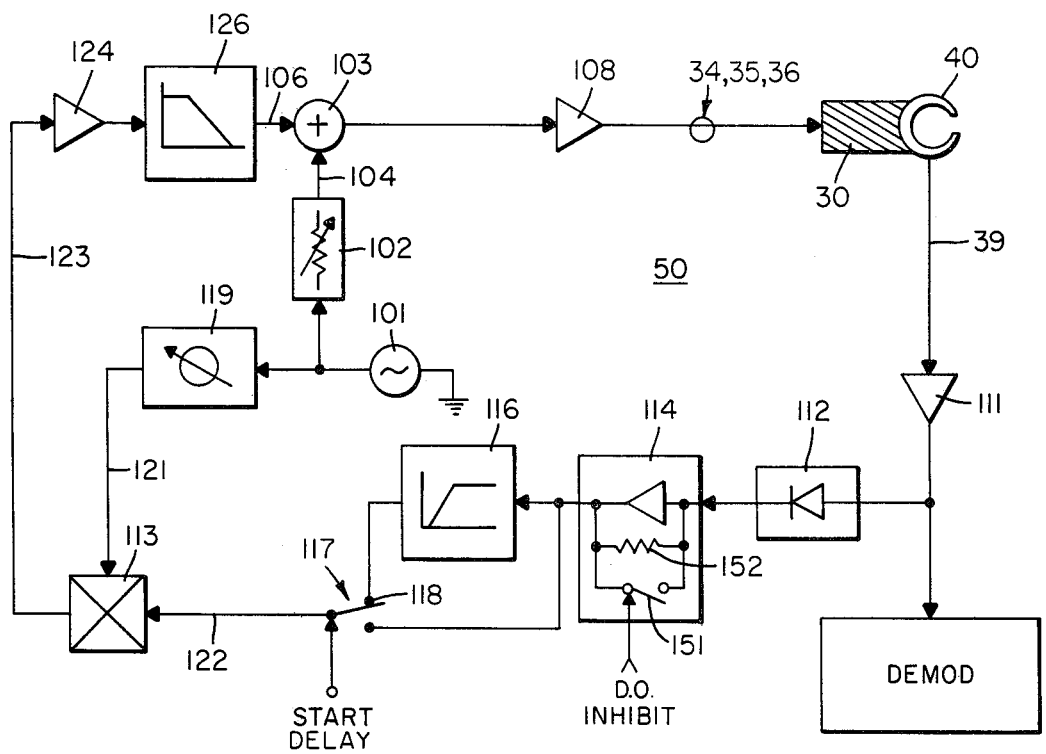
FIG_3
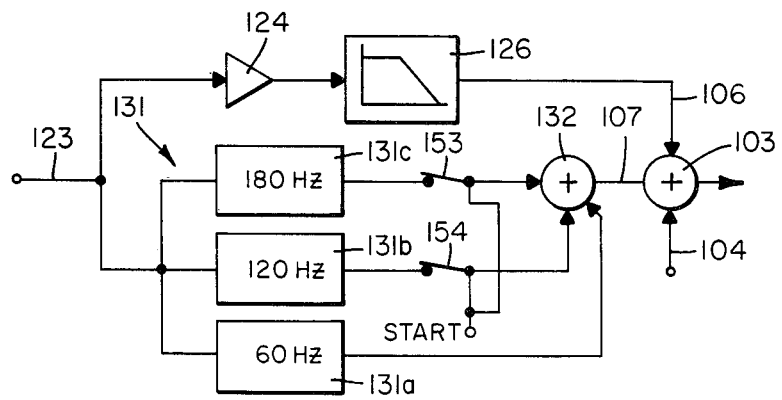
FIG_4
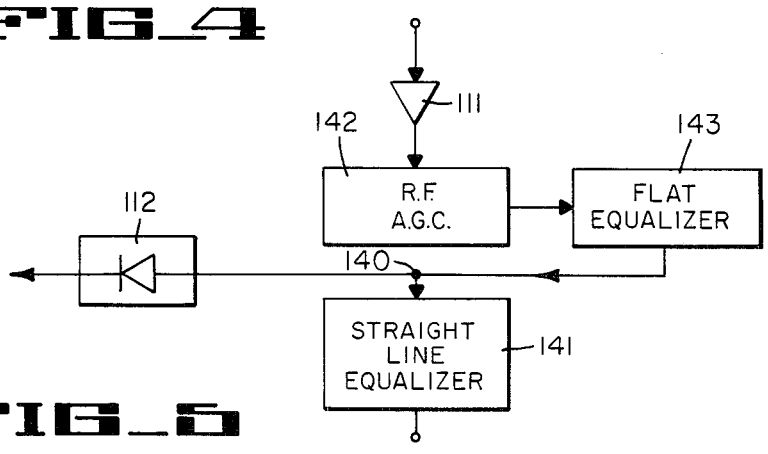
FIG_5

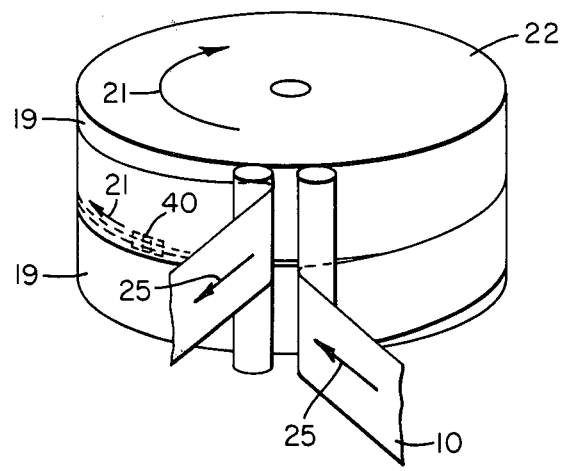
FIG_6
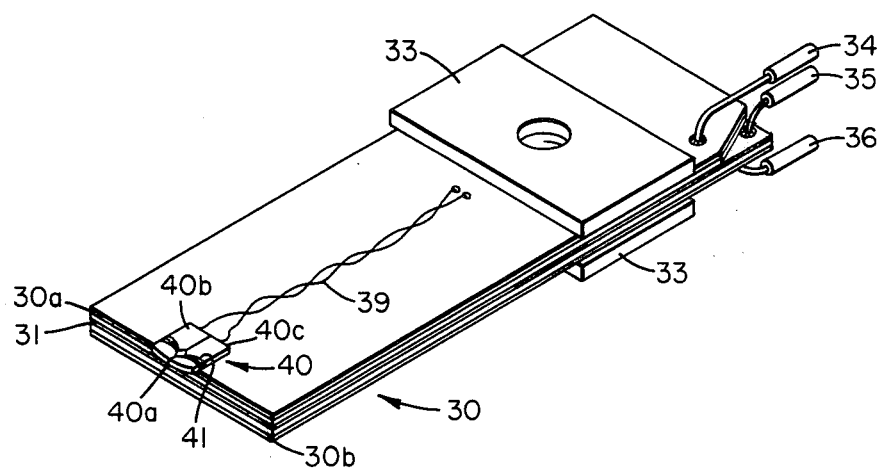
FIG_7

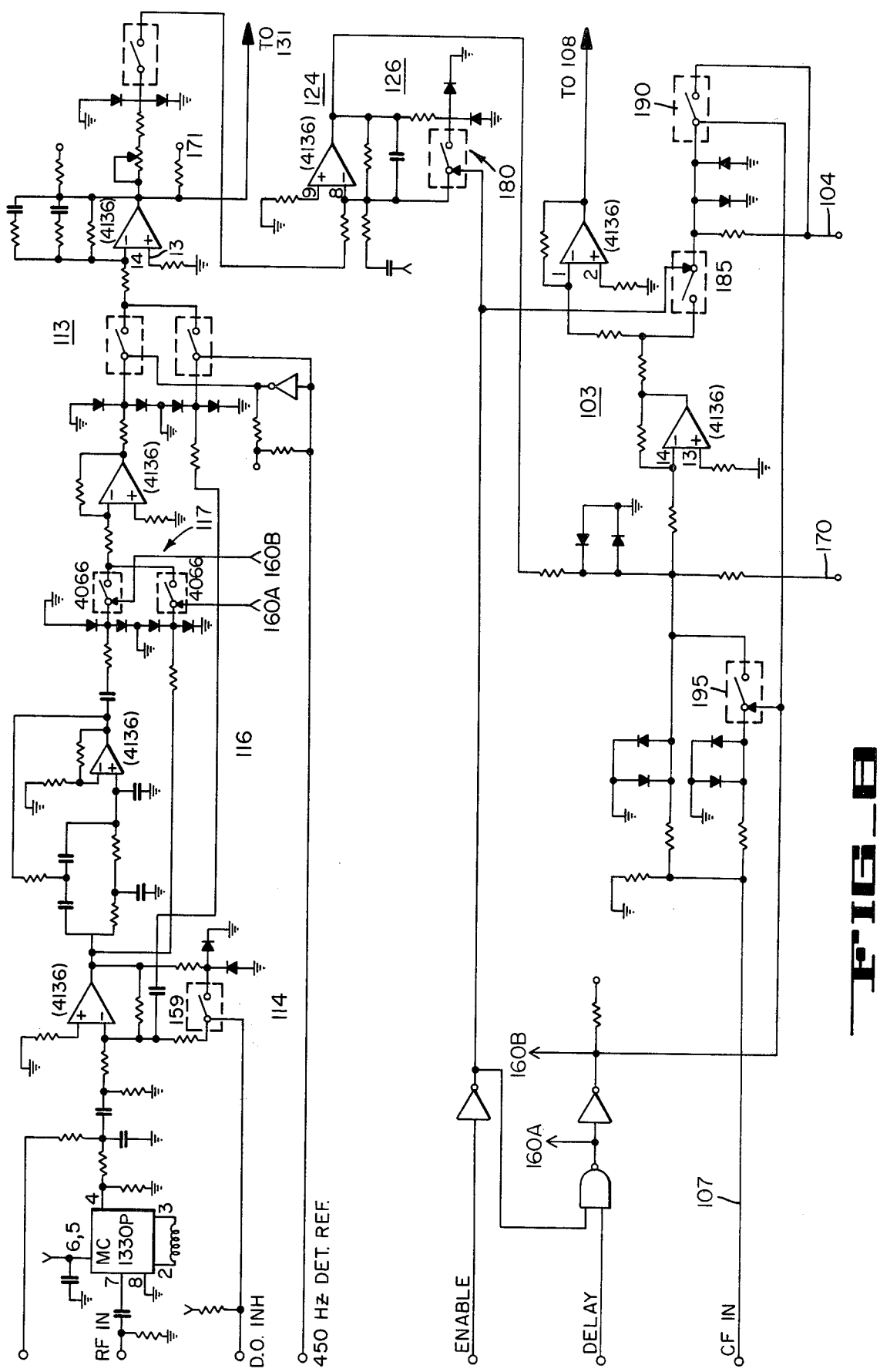
FIG_8

AUTOMATIC SCAN TRACKING USING A MAGNETIC HEAD SUPPORTED BY A PIEZOELECTRIC BENDER ELEMENT

BACKGROUND OF THE INVENTION

In magnetic recording/reproducing systems in which data has been recorded on a magnetic record medium in a series of discrete tracks, the problems of maintaining a magnetic transducer in the optimum transducing position over each track, i.e., tracking, during the reproduction of data has long existed. Imperfect tracking is usually a product of a combination of many factors. Some of the more noteworthy ones are physical instability, irregularities or dimensional changes in the magnetic record medium; differences between the critical tracking-determining dimensions of the machine used to make a recording and those of the machine used to reproduce it; dimensional changes or irregularities in the recording/reproducing machine; and alterations in the track configuration. Imperfect or mistracking often leads to non-repeatability of a recorded track and commonly results in the quality of the reproduced signal being degraded severely. The problem is particularly compounded when previously recorded signals must be reproduced track after track where changes in track configuration may occur.

Failure to follow or repeat track-by-track exactly a recorded track frequently occurs in helical scan video tape record and/or reproduce machines where a video signal is recorded on magnetic tape in a series of discrete parallel tracks diagonally across the tape by one or more heads. It has often been true that as a reproduce head in a helical machine scans the recorded tracks, the head will deviate significantly from the center line of each track, seriously mistracking, and, thereby, reproducing a degraded form of the recorded signal.

Various systems have been proposed in the prior art to position a magnetic head optimally with respect to a track along a record medium. In U.S. Pat. No. 3,838,453, a system is disclosed to place a scanning magnetic head over the center line of each track of recorded data. Tracking reference signals located at the beginning of each track are detected at the beginning of each scan of a data track. A servo system responsive to the sensed tracking reference signals operates to compensate for an off-track condition by controlling a capstan drive motor to adjust the magnetic tape position relative to the scanning magnetic head. While this sytem may correctly locate the scanning head relative to the track at the beginning of the track scan, if the track is not perfectly straight or does not follow a predictable path, the scanning head will deviate from the optimum transducing position over the track as it is scanned. Consequently, such systems are not suitable for use in applications, such as in helical scan machines, where tracking corrections must be made during the entire head scan of a track in order to insure that the optimum transducing position is maintained throughout the scan.

Other systems relying upon alteration of the medium transport to control the relative transducer-to-medium position are described in U.S. Pat. Nos. 3,663,763 and 3,748,408. In some of these medium transport control positioning techniques, control track information separately recorded from the data is reproduced to obtain control signals for adjusting the tension of the record medium to maintain proper tracking by the transducer (U.S. Pat. No. 3,748,408). In others of these medium transport control position techniques, data reproduced from the record medium by a transducer whose tracking is to be controlled is monitored to provide a control signal for adjusting the transport of the record medium to maintain proper tracking by the transducer (U.S. Pat. No. 3,663,763). Altering the speed of transport of the record medium has the undesirable tendency of altering the time base of data reproduced from tracks recorded in the direction of the transport of the record medium. Furthermore, techniques which rely upon the control of the transport of the record medium to maintain proper tracking by the transducer are not suitable for precise control of the transducer position relative to paths along the record medium, particularly, where large displacements (0.05 cm) of transducer/record medium position may be required at high rates (200 deflection cycles per second) to maintain proper tracking by the transducer.

Various other systems have been proposed in the prior art to position a magnetic head optimally with respect to a track along a record medium. In U.S. Pat. No. 3,246,307, a reproduce head is positioned over a track prior to reproducing recorded data. This is accomplished by a head composed of two separate magnetic elements. The head is moved until equal signals are reproduced by each element of the reproduce head. At this time, the head is properly positioned and the head positioner relinquishes control to allow normal reproduction of the recorded signal. In U.S. Pat. No. 3,292,168, two sensor heads are located on either side of the reproduce head adjacent to a data track. In a similar fashion as the system described in the U.S. Pat. No. 3,246,307, the reproduce head is positioned prior to normal reproduction of the recorded signal by the use of a positioning servo. The positioning servo is stopped when zero error difference is represented by the sensor head signals. Systems using control tracks and reproduce head vibration have also been employed for tracking purposes. An example of such systems is described in U.S. Pat. No. 3,526,726. However, none of the systems of that kind have provided during reproduction of recorded data continuous error-free head positioning along the entire length of a data track from head position information derived solely from the recorded data. Nor are such systems particularly suited for reproducing a continuous signal from a series of discrete tracks where the tracks are scanned by a transducer rotating at a substantial speed relative to the record medium.

A system for vibrating a magnetic head about its tracking path as it scans a recorded track along a magnetic disc is described in U.S. Pat. No. 3,126,535. As described therein, a fixed frequency oscillator is coupled to provide oscillatory motion to the head. This causes an amplitude modulation of the reproduced data, which is detected and utilized to position the head over the center of a track. That system includes two discrete correction channels, one for each possible direction of head position error and includes means to disable the head positioning mechanism when track center is located. Therefore, this system, too, is primarily concerned with initially locating a transducer with respect to the center line of a data track rather than continuously maintaining optimum transducing position of the transducer during the entire scan of a track. Such systems are suited for use in data record and/or reproduce systems having long term track configuration stability or where the track configuration stability requirements are not critical.

None of these tracking systems is well suited for continuously maintaining a data transducer in optimum transducing relationship with respect to a moving record medium as the transducer scans it at a high speed, such as in a helical scan video tape recorder where the magnetic record/reproduce head or heads are mounted on a rotating assembly. Furthermore, such prior art tracking systems are particularly unsuited for television recording purposes inasmuch as slightest tracking errors cause objectionable effects in the displayed television signal. In other uses, less than correct tracking may provide suitable accuracy for recovering non-visual data. However, complete recovery of data-type information is important and to such extent the present invention is useful in non-visual data recovery systems.

SUMMARY OF THE INVENTION

Accordingly, the present invention comprises a system for automatic tracking by a record medium scanning transducer in which a data signal transducer is continuously maintained in a desired position with relation to a recorded data or information track. The position of the data transducer relative to the data track is monitored during the entire scan of the data track through the reproduction of recorded data as a small oscillatory motion is imported to the transducer via a supporting positionable element. The transducer is supported by the positionable element and oscillatory motion is induced in the element to cause the transducer to fluctuate laterally about its normal scanning path. The fluctuation of the data transducer introduces deviations in the envelope of the data signal as it is reproduced by the transducer during the scan of the data track. These deviations take the form of an amplitude modulation of the reproduced signal's envelope whose change in magnitude is representative of the amount of lateral displacement of the transducer from the optimum transducing position with respect to a track. The direction of lateral displacement is reflected in the phase of the envelope amplitude modulation at the fundamental frequency of the oscillatory motion.

To maintain the data transducer continuously in a desired position with respect to the optimum transducing position, the polarity and amplitude of the modulated envelope is detected and a correction signal representative of undesired transducer positional deviations generated for use in adjusting the lateral track position about which the data transducer is caused to fluctuate. In this manner, correction is provided during the entire scan of the track to compensate for mistracking to either side of the desired transducer position without the need of track position sensing means operating independently of the data transducer nor control or other reference signals recorded on the record medium separately from the data.

Since the amplitude modulation of the envelope of the reproduced signal is examined to determine the displacement of the transducer relative to the optimum transducing position, the accuracy of such determination depends upon how free the envelope of the reproduced signal is from spurious modulations. For example, in many track segmented video magnetic tape record and/or reproduce machines, periodic interruptions commonly occur in the reproduced video data signal. These periodic interruptions usually are caused by the momentary loss of the video signal during a short interval during the scan of the magnetic tape when the magnetic head transducer is off tape. For example, in helical scan record and/or reproduce machines in which magnetic tape is helically wrapped in an "omega" configuration almost 360° around a cylindrical tape guide drum for scanning by a single rotating head (the wrap is less than 360° for reasons of tape entrance and exit dimensional requirements), loss of the video signal, i.e., dropout, occurs at the frequency of rotation of the head. For television signal recording and/or reproducing applications where a single NTSC 60 Hz standard television field is recorded for each revolution of the rotating head, dropouts occur at a frequency of 60 Hz.

The periodically occurring dropouts act on the reproduced RF signal as a spurious pulse modulation to cause potentially troublesome modulation of the signal's envelope. The harmonically related components of the spurious modulation are frequency distributed at 60 Hz intervals. If these frequency components coincide or fall close to those of the intentional driving force applied to the positionable element, harmful interference results. In accordance with one feature of this invention, the oscillatory driving force applied to the positionable element is selected to have a fundamental frequency so related to that of the aforementioned spurious amplitude modulation that the frequency of the oscillatory drive applied to the positionable element is displaced from the harmonics of the spurious modulation, preferably, to minimize any interference. Minimum interference will result if the fundamental frequency of the oscillatory drive applied to the positionable element is an odd multiple of one-half that of the spurious force, which, in helical scan machines, is one-half the dropout rate.

The automatic scan tracking system of this invention is especially suited to be utilized with the mounting structure described in the co-pending application of Richard Allen Hathaway, Ser. No. 668,651, filed on Mar. 19, 1976 and entitled Positionable Transducer Mounting Structure, and my co-pending application, Ser. No. 668,652, filed on Mar. 19, 1976 and entitled Method And Apparatus For Producing Special Motion Effects In Video Recording And Reproducing Apparatus. As described in the Ser. No. 668,651 Hathaway application, the positionable element can take many forms, including being constructed from piezoelectric, electrostrictive, magnetostrictive or electromagnetically responsive materials. In the embodiment of the invention discussed in detail hereinafter with reference to the drawings, the positionable element includes a cantilever mounted piezoelectric ceramic bender element either manufactured by Vernitron Corp. and identified as PZT-5HN Bender Bi-Morph Poled For Parallel Operation or by Gulton Industries and identified as G 1278 Piezoceramic Bender Element Poled For Parallel Operation.

The scope of the invention may be more particularly understood by an examination of the following detailed description of the preferred embodiment and the appended claims.

BRIEF DESCRIPTION OF THE DRAWINGS

The invention will be described in greater detail with reference to the drawings in which:

FIG. 1 is a schematic illustration of a problem solved by the invention;

FIG. 2 is a partially cut away view of a helical head drum;

FIG. 3 is a schematic block diagram of a servo circuit according to the invention; and, FIG. 4 is a schematic block diagram of an improvement to the circuit of FIG. 3.

FIG. 5 is a detailed electrical schematic diagram of one form of circuitry that can be used to implement the block diagrams of FIGS. 3 and 4.

FIG. 6 is a reduced scale view of the magnetic tape of FIG. 1 helically wrapped around a scanning mechanism including the structure of FIG. 2.

FIG. 7 is a perspective view of a positionable transducer assembly.

FIG. 8 is an electrical schematic diagram of circuitry corresponding to the block diagram of FIG. 3.

DESCRIPTION OF THE PREFERRED EMBODIMENTS

Broadly stated, the present invention is directed to a system for automatic tracking by a record medium scanning transducer in which a data signal transducer is continuously maintained in a desired position with relation to a recorded data or information track. However, the features of the invention are particularly advantageous for track segmental recording of data on magnetic tape by means of one or more magnetic heads rotated at a high speed relative to the tape. While there have been many different recording formats that have been developed, the format in which video or other similarly wide band signals are recorded on magnetic tape as it is transported in a helix around a cylindrically shaped scanning drum has exhibited many distinct advantages in terms of relative simplicity of the tape transport drive and control mechanism, the necessary electronics involved, the number of transducing heads, and the efficient use of tape, in terms of the quantity of tape that is required for recording a given amount of material. By helically wrapping the tape around a rotating scanning head, a single transducing head for reproducing or playing the information that is recorded on the tape can be utilized. When a single head is used in a helical tape recording apparatus, two recognized alternatives are available for wrapping the scanning head, and are generally referred to as the "alpha" wrap and the "omega" wrap apparatus.

The alpha wrap has the tape introduced from one side and wrapped completely around the drum so that it exists on the opposite side and is referred to as the alpha wrap for the reason that it generally conforms to the Greek symbol alpha ($\alpha$) when one views the arrangement from above. The omega wrap introduces the tape by bringing it toward the drum in a generally radial direction and passes it around a guide to bring it in contact with the surface of the drum, helically wraps the tape around the drum, passes it around another guide so that it also exits the drum also in a generally radial direction. The tape generally conforms to the shape of the Greek symbol omega ($\Omega$) when it is viewed from above. Both of these configurations are helical wrapped in that the tape is wrapped around the scanning drum in a helical manner with the tape exiting the drum surface at a different axially displaced position relative to the entry thereof. In other words, if the drum is vertically oriented, the tape leaves the drum surface either higher or lower than when it first contacts the surface. The video information signals are recorded on discrete parallel tracks that are positioned at an angle relative to the longitudinal direction of the tape so that a track length greatly in excess of the width of the tape can be achieved. The angular orientation of the recorded tracks are a function of both the speed of the tape being transported around the scanning drum as well as the speed of rotation of the scanning drum itself. The resultant angle therefore varies depending upon the relative speeds of both the rotating scanning drum and tape being transported.

While the present invention will be specifically described in connection with an omega wrap helical video tape recording apparatus, it is equally applicable to an alpha wrap helical tape recording apparatus. Additionally, while the present invention will be described in conjunction with a 360° omega wrap apparatus (it being understood that the tape does not contact the scanning drum a full 360° because of tape entrance and exit dimensional requirements), the present invention is also applicable to helical video tape recorders which utilize less than 360° wrap, e.g., a 180° wrap path apparatus having more than one head. It should also be understood that the present invention is applicable to arrangements where the scanning drum can move in either rotational direction and the tape can be introduced either above or below the exit path and moved around the scanning drum in either direction. The relationships of head rotation, tape transport direction and manner of tape guiding, i.e., introducing the tape above or below the path of its exit, can represent up to eight different configurational relationships of which only one will be specifically described herein as shown by the direction of the arrows 25 in FIG. 6 of the drawings.

In helical scan video tape recorders, the path followed by a magnetic video head transducer during reproduction often does not coincide with the track of a previously recorded video data. Referring to FIG. 1, a section of magnetic video tape 10 is schematically shown with one track 12 of data (depeicted in a dashed line) previously recorded by a helical scan video tape recorder. As previously mentioned, during data recording and reproducing operations, the tape is guided under tension so that recording occurs under a recommended standard value of longitudinal tension, which induces a certain degree of stretching of the tape. If the tape is played back at a different tension because of faults in the tensioning mechanism, or because of unavoidable variations in the mechanisms of different machines, then the length, straightness and inclination of the data relative to the video head track will be different. Under such circumstances, the head will not perfectly follow the data track, leading to undesirable variations in the strength of the reproduced signal, such as variations in the amplitude of the RF envelope 16. A similar effect results if the correct tension is used on playback, but the tape has shrunk or elongated due to changes in atmospheric or storage conditions, e.g. temperature or humidity. Also, irregular tape edges and differences in edge-guiding effects from machine to machine, can cause irregularly wandering tracks or scans. Consequently, the path 14 taken by the video head during reproduction as it scans the tape 10 often fails to exactly coincide with the recorded track 12. In actual practice it has been found that a deviation of 0.0025 cm between the recorded track 12 and the path 14 taken by the reproduce head can result in significant deterioration in the quality of the reproduced video signal.

One solution to precise tracking of paths by signal transducers along a record medium is offered by the present invention. Briefly, a magnetic video head signal transducer 40 can be mounted on a separate support comprising a scanning drum carrier for rotation coaxially between two stationary guide drums, most commonly cylindrical. Alternatively, the video head 40 can be carried on a support here shown as a rotatable upper guide drum 22 associated with a stationary lower guide drum 24 as in FIGS. 2 and 6, the coaxially disposed drums forming a scanning assembly providing a surface 19 for guiding the tape 10. The upper drum 22 is fixed to a driven shaft 26, which is fitted for rotation in a bearing 28 mounted on the lower drum 24 and driven by a motor (not shown) in a known manner. The magnetic tape 10 is helically wrapped (i.e., substantially 360°) around the drums 22, 24 for scanning by the head 40. The tape 10 is guided, tensioned and moved (arrows 25) by means not shown but well know in the art so that the head 40 carried by drum 22, rotating in direction 21 opposite the direction of tape transport about the guide drums, scans a series of oblique transverse paths 14 of which only one is shown in FIG. 1. It should be appreciated that the head 40 can rotate in the same direction as that of the movement of the tape 10 about the guide drums 20, 22. However, this change in head rotation does not alter the implementation of the present invention.

Head 40 is extremely small and of low mass (on the order of 100 milligrams), and consists of two pole pieces 40b and 40c confronting one another across a non-magnetic transducing gap 40a for recording and/or reproducing signals with respect to the tape 10 (see FIG. 7). The gap 40a is aligned with the length thereof substantially parallel to the direction 21 of drum 22 movement relative to the tape 10. It will be understood that in the magnetic recording art the "length" of the gap is the dimension from pole face to pole face, in the direction of relative recording motion. Usually, the "width" of gap is aligned transversely to the relative motion direction and parallel to the recording surface, and the "depth" of the gap is normal to the recording surface. If for any reason the gap is inclined to the direction of relative motion, the length is still defined (at least for purposes of this invention) to be in the direction of relative motion, while the width and depth dimensions are still taken as being orthogonal to the length. Signals are carried to or from the head 40 by means o pole piece windings 41 and lead 39. (See FIG. 7) Signals are coupled between the magnetic head 40 and the recording surface passing the gap 40a through a coupling path that extends between the two pole pieces 40b and 40c through the recording surface in the direction of relative motion, hence the desired track on the surface.

To provide for tracking movement of the head 40 transverse to the direction 21 of the drum 22 movement, the head is mounted or bonded, as by epoxy to one flat side of a positionable element 30, here shown by way of example as a piezoelectric ceramic bender element. It will be seen from FIG. 2 that the head 40 is fitted to the upper rotating drum 22. The piezoelectric bender element 30 is elongated and is mounted at one end in a cantilever support element 32 fixed to upper drum 22. As will be more particularly described later, the bender element bends in response to an applied voltage in directions transverse to track 12 to deflect the video head 40 lateral to the recorded track 12. Support 32 may be constructed in any suitable manner such as from machined aluminum and may be attached to drum 22 by screws, or other means. The support must be electrically insulated from deflector 30 when a piezoelectric ceramic bender is used as the deflector.

The details of the particular construction of the positionable element 30 are the subject of and are described the aforementioned commonly assigned and co-pending application of Richard Allen Hathaway U.S. Ser. No. 668,651 for Positionable Transducer Mounting Structure. A brief description will be included herein to facilitate understanding the present invention. The piezoelectric ceramic bender element 30 is constructed of two layers 30a and 30b of piezoelectric ceramic material sandwiched between electrode members and bonded together in a known manner to an intervening brass vane 31. The element is elongated and significantly wider than thick. For cantilevered positionable elements, a length-to-width aspect ratio of 2:1 and a thickness on the order of 3.0% of the width provides the desired deflection characteristics. The axes of polarization of the two piezoelectric layers are oriented with respect to one another so that, when a voltage is applied across the bonded layers, one layer is caused to expand and the other to contract in a known manner. The device is thereby caused to flex or bend. The amount of movement depends on the voltage applied across the layers of piezoelectric material. The piezoelectric element 30 is fixed to the cantilever support 32 by two electrically insulating spacers 33 located on both flat sides of the element 30 proximate one of its ends. An open-ended protective housing (not shown) surrounds the bender element 30, with the leaf disposed therein to extend from the spacers 33 with its free end outside the open end of the unshown housing whereby the head 40 is supported so that it slightly projects beyond the outside surface 19 of the tape guide drums, 22 in transducing relationship with respect to the tape 10. Leads 34, 35, 36 are soldered to the electrodes of the piezoelectric element 30 for coupling a driving voltage to the element. A servo drive circuit 50 is connected to control the drive applied to the element 30 in a manner to be described below so that the head 40 is maintained in a desired transducing relationship with respect to the tape 10.

Referring to FIGS. 3-5 and 8, a servo circuit for maintaining a video reproduce head 40 in the optimum transducing relationship with respect to a track 12 extending obliquely across the tape 10 is shown. A dither oscillator 101 generates a sinusoidally varying signal at a fixed frequency $f_D$. To avoid harmful signal interferences with the recorded video signal reproduced by the head 40, the dither oscillator 101 is operated to provide a pure sinusoidally varying signal at the fundamental frequency $f_D$ preferably having less than 1% higher order harmonic content. The output of dither oscillator 101 is applied to an adjustable attenuator 102 which may be manually adjusted to calibrate the oscillator output to an appropriate amplitude. The output of attenuator 102 is fed to one input 104 of a summing circuit 103 where it is added to a low rate or DC error correction signal, to be described later, and present at input 106 and, if high rate error correction is desired, a high rate or AC error correction signal at input 107 (see FIG. 4). The output of summing circuit 103 is amplified by a drive amplifier 108 and the amplified signal is coupled to drive the bender element 30 by way of leads 34, 35, 36. Circuitry for developing the drive signal is described in my co-pending application Ser. No. 668,581 for Drive Circuitry for Controlling Movable Video Head, filed on Mar. 19, 1976. The oscillator drive signal excites the bender element 30 to impart a small peak-to-peak (preferably 10% to 15% of the width of track 12) oscillatory motion (dither) to the head 40 to cause the head to move laterally to the track 12 alternately between limits as it scans the track to reproduce the recorded signal. Limiting the oscillatory motion of the head 40 to the small amount insures that the head is kept well within the boundaries of the track 12 and its flanking guard bands, thereby avoiding detrimental cross talk. In the helical scan video tape recorder environment in which this embodiment of the invention is constructed to operate, the recorded tracks of video are 0.145 mm wide separated by guard bands of 0.076 mm. Thus, the drive amplifier 108 is arranged to provide an oscillatory drive signal that causes the head 40 to oscillate or dither laterally to each track I 0.010 mm about the head's home position as it follows the track 12. (The head's home position is determined by the servo drive circuit's negative feedback loop to be described hereinbelow.)

The oscillatory motion imparted to the head 40 causes an amplitude modulation of the reproduced signal, which, when recording video or other such high frequency signals, as in the form of an RF envelope of frequency modulated carrier. Because the magnitude of amplitude deviations in the modulation of the RF envelope are used to maintain the head in the desired transducing position with respect to the track 14, the precision with which such position is maintained is dependent upon the sensitivity of the servo drive circuit and how free the reproduced RF envelope is from spurious modulations.

As described hereinbefore, periodic reproduced signal interruptions or dropouts common to track segmented recorder and/or reproduce machines act on the reproduced RF envelope as a spurious pulse modulation, which have harmonically related components distributed at frequency intervals of the dropout rate. For a single head and field per track helical scan recording format used to record signals of a 60 Hz television signal standard, the dropout rate is 60 Hz. In 50 Hz television standards, the dropout rate would be 50 Hz. If any of the harmonically related components of the spurious dropout induced pulse components coincide or fall close to that of the dither frequency, $f_D$, harmful interference results. Minimum interferences will result if the dither frequency, $f_D$, is an odd multiple of one-half the dropout rate.

In addition, the dither frequency, $f_D$, should be selected to avoid regions about anti-resonance points found to be present in the response characteristic of piezoelectric ceramic bender devices commonly employed as the positionable element 30 in transducer mounting structures of the kind described in the aforementioned Hathaway application Ser. No. 668,651. Furthermore, the dither frequency, $f_D$, should be set so that the piezoelectric element 30 is operated in a region of high sensitivity.

Piezoelectric ceramic bender devices have been found to have a family of anti-resonant frequencies, $f_A$, within their response characteristic. Furthermore, the lower-most anti-resonant frequency $f_{A1}$, of the same type piezoelectric device has been found to vary from device to device over a range of hundreds of hertz. For example, devices of the aforementioned types constructed in accordance with the aforementioned dimension specifications are found to have a lower-most anti-resonant frequency, $f_{A1}$, anywhere within the range of about 750 to 1100 Hz. Furthermore, such devices ordinarily have fundamental and higher order resonances with a lower-most resonant frequency, $f_R$, of about 400 Hz, but it can vary between typical values of 350 Hz to 450 Hz from device to device.

For maximum sensitivity and immunity against anti-resonance effects, the dither frequency, $f_D$, should be set at a frequency situated within a resonance region and outside any anti-resonance region. Because of the wide variations from device to device of the anti-resonant frequency characteristic and the fixed lower-most resonance frequency of devices of the same kind, it is convenient to place the dither frequency within the aforementioned range of the lower-most resonance. A dither frequency, $f_D$, of 450 Hz satisfies this convenience criteria and also is an odd multiple of one-half the 60 Hz dropout rate (i.e., $15 \times 60/2$), thereby satisfying the minimum interference criteria.

Dithering of the head 40 causes an amplitude modulation of the reproduced RF envelope. If the head 40 is located at the center of the track 12, only even harmonic components of the dither signal are produced by the action of the positionable element 30, because the average head position is at track center and the envelope variation caused by dithering appears as a symmetrical function. The amplitude of the RF envelope reproduced from the tape 10 is maximum at track center. As the head 40 moves to either side of track center, the amplitude of the reproduced RF envelope decreases by the same amount. The fundamental of the dither signal is, thereby, balanced out and does not appear as RF envelope modulation. Therefore, dithering the head 40 laterally to the track 12 introduces amplitude deviations in the RF envelope only at twice the dither frequency, $f_D$.

On the other hand, if the head 40 is located slightly off the center of the track 12 to either side, the reproduced RF envelope amplitude variation will no longer be symmetrical because head 40 excursions to one side of the track 12 will produce a different RF envelope amplitude decrease then produced by an excursion towards the opposite side. Hence, the maximum-to-minimum envelope amplitude variation occurs once for each cycle of the dither signal, or at the dither frequency, $f_D$, with the order of occurrence of the maximum and minimum points depending upon the side of track center to which the head 40 is offset. The fundamental of the dither frequency is no longer balanced out and the reproduced RF envelope variations will exhibit a fundamental component of the dither frequency, with the phase of the fundamental component for an offset to one side of the center of the track 12 180° out of phase with respect to that for an offset to the other side of track center. Detection of the order of occurrence of the maximum and minimum points, hence phase of the envelope amplitude variations, provides information definitive of the direction the head 40 is offset from the center of track 12, and detection of the envelope amplitude variation provides information definitive of the amount of offset, or a track error signal.

To obtain this head position information, the modulated RF envelope signal reproduced by the head 40 is coupled to detection circuitry through a video reproduce preamplifier 111 commonly found in video tape record and/or reproduce systems. To an extent, the tracking error signal which varies the amplitude of the reproduced RF envelope is exhibited as a double-sideband, suppressed carrier (DSB/SC) modulation of the detector fundamental frequency. Therefore, to recover the tracking error signal, the reproduced signal output by the preamplifier 111 is coupled for processing by two amplitude modulation detectors 112 and 113. The first detector 112 is a simple amplitude modulation RF envelope detector, which is constructed to recover the dither signal fundamental and its sidebands. The output signal from envelope detector 112 is merely a rectified version of the reproduced signal, containing the fundamental and sideband components of the dither frequency, $f_D$. This output signal is applied to a 450 Hz AC coupled amplifier 114 and there after passed through a 175 Hz high pass filter 116, the bandwidth of which is sufficient to include the dither fundamental and its sidebands, and, thereby, to pass the significant error signal spectrum. The purpose of the filter is to attenuate undesirable low frequency spurious signals and noise which may be present in the error signal spectrum. The output of the high pass filter 116 is connected via terminal 118 of an electronically actuated switch 117 to the signal input of a second detector 113, which is a synchronous amplitude modulation detector. As will be described hereinafter in greater detail, switch 117 serves to bypass the filter 116 during start-up times to facilitate rapid synchronization of head tracking.

Sync detector 113 is of conventional design of the kind which operates on the principle of coherently detecting the amplitude and polarity of an unknown input signal with reference to the phase of a reference signal of the same frequency. Such detectors provide a rectified output having the amplitude of the unknown input signal and being positive when the two signals are in phase and negative when the two signals are 180 degrees out of phase. To ensure that the correct reference signal phase is applied to the sync detector 113, a phase adjuster 119 is coupled between the output of the oscillator 101 and the reference input 121 of the detector 113 phase adjuster 119 adjusts the reference dither frequency provided by oscillator 101 to be at the proper 0° or 180° with respect to the fundamental dither frequency component present in the input to the sync detector 113. Since the signal present at the input 122 of sync detector 113 will have a component at the fundamental dither frequency, $f_D$, whenever an error occurs in head track position, sync detector 113 will provide at its output 123, a track error signal representative of the head track position error. The amplitude of the error signal is proportional to the amount that the bias position of head 40 is displaced from track center. The polarity of the track error signal is indicative of the direction of head displacement from track center.

The output 123 of the sync detector 113 is coupled to the input of a loop gain DC amplifier 124 which introduces some gain in the servo circuit to provide a suitable signal level for driving the drive amplifier for the positionable element 30. The output from the loop gain amplifier 124 is fed to a low pass filter 126 which compensates the servo loop response for optimum loop stability. This low pass filter 126 provides the dominant time constant of this loop of the servo circuit 50.

This compensated track error signal corresponds to the low rate or DC error in the position of the head 40 relative to the track 12. The low rate error signal is applied to the summing circuit 103 where it is summed with the dither frequency output from the oscillator 101. The composite signal resulting therefrom is fed from the output of the summing circuit 103 to the drive amplifier 108 which applies the composite signal to the piezoelectric bender positionable element 30. The low rate or DC component of the composite signal adjusts the bias position of the head 40 in accordance with the track error signal detected by the synchronous detector 113, thereby, laterally displacing the head 40 to maintain an optimum transducing position with respect to the track 12.

Since the recorded tracks are parallel to one another and adjacent tracks tend to produce similar track errors in a helical scan format, the track error signal can be considered during a short interval as being repetitive from track to track. The content of the error signal includes a DC component plus components related to the rate of head rotation. The exact harmonic content will vary with changes in the instantaneous head position error. Improved circuitry to take advantage of the repetitive nature of the track error signal is shown in FIG. 4. A band selective or comb filter 131 is placed in parallel with the loop gain amplifier 124 and low pass composite filter 126. A three stage form of comb filter 131 is employed in the embodiment herein described; whose first stage 131a is centered at 60 Hz (the fundamental of head rotation), whose second state 131b is centered at 120 Hz, and whose third stage 131c is centered at 180 Hz. Each of the stages of the comb filter 131 has a Q equal to 100. The outputs of the two stages 131b and 131c centered at the second and third harmonic of the head rotation rate are coupled through switches to be described below for comparing in a summing circuit 132. The output of the first comb filter stage 131a is directly coupled to the summing circuit 132. The combined outputs of the three stages of the comb filter 131 are coupled to the input 107 of the summing circuit 103 for combining with the low rate error signal and dither signal and subsequent application to the positionable element 30. This provides an AC error signal component to the composite track error signal and has an effect of enhancing the signal-to-noise ratio of the servo circuit 50 by eliminating noise contributions from frequencies away from the error component. The comb filter 131 effectively provides an electrical inertia which resists any sudden changes in the error waveform once a proper error signal has been generated. Consequently, the servo circuit 50 has a response bandwidth capable of responding to errors up to, in this embodiment, the third harmonic head rotation rate with a relative bandwidth with respect to noise or other perturbations at frequencies away from the error components. Because of the high rate of gain change with frequencies exhibited by the comb filter and the fact that the net phase shift passes through 0° at each pass band of a comb filter stage or tooth, the servo is capable of providing much more correction gain at multiple track scan rate frequencies when compared to a simple R-C open loop roll-off filter means. Therefore, the correction waveform of the composite track error signal which is applied to the positionable element 30 more accurately represents the original head position error.

The commonly employed process of frequency modulating a carrier with a video signal for recording gives rise to spurious amplitude modulated components in the envelopes of the reproduce signal output by the preamplifier 111. These spurious envelope modulations are in addition to those arising out of the dithering of the positionable element 30. The spurious components primarily result from the non-uniform frequency response in the record/reproduce system. Such spurious components may have a significant effect on the envelope produced in the reproduced signal. False track error indications could result.

To avoid such false track error indications, the input of the envelope detector 112 is coupled to the video reproduce system at a circuit point 140 between the input of the straight line equalizer 141 and the output of a flat equalizer 143 which receives the output of an RF automatic gain control circuit 142 commonly found in video record/reproduce systems for color television signals. This arrangement is shown in FIG. 5. The straight line equalizer 141 usually is of the kind described in U.S. Pat. No. 3,340,767. The flat equalizer 143 is preferably in the form of a filter whose frequency response complements the response of the system up to the input of the equalizer 143 so as to compensate for undesired amplitude variations in the RF signal due to the non-uniform frequency response of that part of the system which precedes the equalizer 143. The automatic gain control circuit maintains the average level of the RF signal at a predetermined level so as to maintain the loop gain of the system of a desired level.

In single head helical scan tape recorders of the kind described hereinabove, the head 40 is actually off the tape during an interval between the end of the scan of one track and the beginning of a scan of another track. The absence of a reproduced signal at this time would appear as a false high rate track error signal. To obviate the apparent false error thus generated, the AC coupled amplifier 114 has an electronic switch 151 in parallel with its gain controlling resistor 152 which is closed to cause the AC amplifier to have zero gain during the dropout interval. The electronic switch is responsive to a dropout signal commonly provided by the control signal processing system of helical scan recorders of the type described herein. In addition, the second and third harmonically related teeth of the comb filter 131 are disconnected from the summing circuit 132 by the opening of the electronic switches 153 and 154 in response to a signal initiated by the operator. In this manner an apparent false track error signal is prevented from affecting the operation of the servo circuit 50 during start-up times and dropout intervals.

The circuitry of FIG. 3 is a block diagram of merely one arrangement of components that may be used in accordance with the present invention. The electrical schematic diagram of specific circuitry used to construct the embodiment of FIG. 3 is shown in FIG. 8. Reference numbers have been added to FIG. 8 relating to specific circuitry to the block diagram of FIG. 3. In addition to the features of the present invention discussed with reference to FIGS. 3–5, the servo drive 50 also includes provisions for enhancing the operations during start up time. In this regard, the operator initiates the generation of an enable command which is coupled to the electronic switches 180 and 185. The switch 180 opens in response to the enable command to free the DC amplifier 124 for normal operation. The switch is normally closed when the servo circuit 50 is in a standby condition to keep the output provided by the DC amplifier 124 at zero DC, thereby, maintaining the DC amplifier in a condition for immediate operation. The switch 185 couples the dither frequency signal to the summing circuit 103 for application to the positionable element 50.

After a suitable delay to permit all servo conditions to be established, a delay command, timed to the enable command, is coupled to allow switch 117 to remove the shorted path between the AC coupled amplifier 114 and sync detector 113 and connect the high pass filter 116 to the input of the sync detector 113. This delay command is also coupled to an electronic switch 190 to return the amplitude of the dither frequency signal to its normal level after having been increased to two times the normal level during the interval between the enable command and delay command. An electronic switch 195 in the path between line 107 and summing circuit 103 also is opened by the delay command to return the amplitude of the high rate error component to its normal level after the start-up interval. The increased amplitude signals facilitate rapid synchronization of the heads to the proper track position.

The circuit components used in constructing the specific circuitry embodiment of FIG. 8 are identified as follows:
MC1330P manufactured by Motorola
4136 manufactured by Raxtheon
4066 manufactured by RCA The automatic scan tracking system of this invention is particularly suited for use with the inventions subject of the above identified applications. With respect to the special motion effects system subject of the invention described in the application Ser. No. 668,652, such system is coupled to receive the low rate track error component from servo circuit 50 at terminal 171. The special motion effects invention returns a positioning command to terminal 170 coupled to the summing circuit 103 and thereby is added to the drive signal provided to the piezoelectric bending positionable element 30.

We claim:

1. A data reproducing system comprising a transducer for reproducing data signals recorded along a track on a record medium, a positionable element for mounting said transducer for displacement lateral to the track, oscillation means coupled to said positionable elemment to provide a continuous lateral oscillation of the position of said transducer about a bias position as data signals are reproduced to thereby alter the reproduced data signal, sensing means operatively associated with the transducer and continuously responsive to the data signal reproduced thereby to generate a control signal continuously indicative of the alterations in the reproduced data signal when said transducer is reproducing data signals from the track, and servo means coupled between the sensing means and the positionable element and responsive to the control signal to displace the positionable element to adjust the bias position of the transducer, said servo system being responsive to said control signal when said element is positioned at said bias position on or either side thereof.

2. The system of claim 1 wherein the servo means includes means responsive to AC components in the altered reproduced data signal to adjust the displacement of the positionable element in accordance with the AC component.

3. A rotary segmental scan tape record and/or reproduce system for reproducing time modulated data signals recorded along separate tracks on magnetic tape comprising a magnetic head transducer for reproducing data signals recorded along a track on the magnetic tape, a positionable element for mounting said transducer for displacement lateral to the track, oscillation means coupled to said positionable element to provide a continuous lateral oscillation of the position of said transducer about a bias position generally centered on said track as data signals are reproduced to thereby cause amplitude modulation of the envelope of the reproduced data signal, said oscillation means providing sinusoidal oscillations at a frequency equal to an odd multiple of one half the rate at which tracks of recorded data signals are reproduced, sensing means operatively associated with the transducer responsive to the amplitude modulation of the envelope of the reproduced data signal to generate a control signal indicative of the envelope's amplitude modulation, and servo means coupled between the sensing means and the positionable element for displacing the positionable element to adjust the bias position of the transducer in response to said control signal, said servo means being operable when said element is centered or on either side of said bias position, so that said servo means is generally continuously responsive to said control signal as said data signals along said track are reproduced to minimize amplitude modulation interference that can be produced by harmonically related components of the rate at which said tracks are reproduced.

4. The system of claim 3 wherein the reproducing system includes means for removing spurious amplitude modulation from the reproduced data signals, and the sensing means is coupled to receive the reproduced data signals following the passage of said reproduced data signals through the means for removing spurious amplitude modulation.

5. The system of claim 3 wherein each track of recorded data signals is flanked by guard band zones, and said oscillation means provides an output that limits the maximum lateral displacement of the transducer from the bias position to less than a distance equal to the guard band zone separating adjacent tracks plus one-half the dimension of the track in the lateral direction.

6. The system of claim 3 wherein the positionable element for mounting the magnetic head transducer has resonances and anti-resonances within its displacement response characteristic with fundamental resonant frequency lower than the lower-most anti-resonant frequency, the oscillation means provides oscillations at a frequency within a resonance region and outside an anti-resonance region.

7. The system of claim 6 wherein the oscillation means provides oscillations at a frequency equal to an odd multiple of one-half the rate at which tracks of recorded data signals are reproduced which is within the resonance region including the fundamental resonant frequency.

8. The system of claim 3 wherein the transducer experiences deviations in its bias position including a low rate deviation component and a high rate deviation component, and said servo means includes a low rate servo means and a high rate servo means, said low rate servo means being responsive to the sensing means to provide a first position deviation signal representative of the low rate deviation component, said high rate servo means responsive to the sensing means to provide a second position deviation signal representative of the high rate deviation component, said first and second position deviation signals coupled to the positionable element to adjust the position of the transducer to compensate for the deviations in its bias position.

9. The system of claim 8 further comprising signal summing means coupled to receive said first and second position deviation signals and said oscillations provided by the oscillation means and combine them for coupling as a composite signal to drive the positionable element.

10. The system of claim 8 wherein said high rate servo means includes a band selective comb filter providing a plurality of parallel circuit paths between its input and output each having a different frequency pass band centered at a multiple of the rate at which tracks of recorded data signals are reproduced.

11. The system of claim 10 wherein one of said parallel circuit paths of said comb filter has a frequency pass band centered at the rate at which tracks of recorded data signals are reproduced, and said high rate servo means further includes means for disabling the other of said parallel circuit paths for an initial interval during start-up.

12. The system of claim 8 wherein said high rate servo means includes means for adjusting the second position deviation signal to increase the drive provided to the positionable element for an initial interval during start-up.

13. The system of claim 3 further including means for adjusting the oscillations provided by the oscillation means to increase the drive provided to the positionable element for an initial interval during start-up.

14. The system of claim 3 further including means responsive to the completion of the scan of each track to reduce the gain of the servo means for a selected interval.

15. The system of claim 3 wherein said sensing means includes a first detection means responsive to the reproduced data signals to provide a signal representative of the fundamental and sideband components of the amplitude modulated envelope, and comparing means for comparing the representative signal and the oscillation to provide said control signal.

16. The system of claim 15 wherein the transducer experiences deviations in its bias position including a low rate deviation component and a high rate deviation component, said sensing means further includes an AC amplifier coupled to receive said representative signal and a high pass filter coupled between the AC amplifier and the comparing means, and said servo means includes a low rate servo means and a high rate servo means, said low rate servo means responsive to the comparing means to provide a first position deviation signal representative of the low rate deviation component, said high rate servo means responsive to the comparing means to provide a second position deviation signal representative of the high rate deviation component, said first and second position deviation signals coupled to the positionable element to adjust the position of the transducer to compensate for the deviations in its bias position.

17. The system of claim 16 wherein said AC amplifier includes a gain determining component, and further including means responsive to the completion of the scan of each track to adjust the gain determining component to reduce the gain of the servo means for a selected interval.

18. The system of claim 15 wherein said oscillation means includes means for adjusting the phase of the oscillations coupled to the comparing means.

19. A rotary segmental scan tape record and/or reproduce system for reproducing data signals recorded along separate tracks on magnetic tape comprising:
a magnetic head transducer for reproducing data signals recorded along a track on the magnetic tape;
a positionable element for mounting the transducer for lateral displacement relative to the lengthwise direction of the track;

oscillation means coupled to the positionable element to provide generally continuous lateral oscillation of the transducer about a bias position that is generally centered on the track as data signals are reproduced to thereby cause amplitude modulation of the envelope of the reproduced data signal;

means for removing spurious amplitude modulation from the reproduced data signals that is caused by frequency modulation of the reproduced data signal;

sensing means adapted to receive said reproduced data signals with spurious amplitude modulation removed therefrom for generating a control signal indicative of the amplitude modulation of the envelope of said reproduced data signal;

servo means coupled between the sensing means and the positionable element for displacing the positionable element to adjust a bias position of the transducer in response to said control signal, said servo means being operable when said element is centered or on either side of said bias position, so that said servo means is generally continuously responsive to said control signal as said data signals along said track are reproduced.

20. The system of claim 19 wherein said oscillation means provides sinusoidal oscillations at a frequency equal to an odd multiple of one half the rate at which tracks of recorded data signals are reproduced to minimize amplitude modulation interference that can be produced by harmonically related components of the rate at which said tracks are reproduced.

21. A recording and/or reproducing system for reproducing data signals recorded along separate tracks on a record medium, comprising:

a magnetic head transducer for reproducing data signals recorded along a track on the magnetic medium;

a positionable element for mounting said transducer for lateral displacement relative to the lengthwise direction of the track;

oscillation means coupled to said positionable element to provide a generally continuous lateral oscillation of the position of said transducer about a bias position generally centered on said track as data signals are reproduced for causing amplitude modulation of the envelope of the reproduced data signal, said transducer experiencing deviations in its bias position which include a low rate deviation component and a high rate deviation component;

sensing means operatively associated with the transducer responsive to the amplitude modulation of the envelope of the reproduced data signal for generating a control signal indicative of the amplitude modulation of the envelope;

servo means coupled between the sensing means and the positionable element for displacing the positionable element to adjust the bias position of the transducer in response to said control signal, said servo means including a low rate servo means and a high rate servo means, said low rate servo means being responsive to the sensing means to provide a first position deviation signal representative of the low rate deviation component, said high rate servo means responsive to the sensing means to provide a second position deviation signal representative of the high rate deviation component, said first and second position deviation signals coupled to the positionable element to adjust the position of the transducer to compensate for a deviation in its bias position.

22. A system as defined in claim 21 wherein the oscillation provides sinusoidal oscillations at a frequency equal to an odd multiple to one half the rate in which tracks of recorded data signals are reproduced to minimize amplitude modulation interference that can be produced by harmonically related components of the rate at which said tracks are reproduced.

23. A system as defined in claim 22 wherein the reproducing system includes means for removing spurious amplitude modulation from the reproduced data signals and the sensing means is coupled to receive the reproduced data signals following the passage of said reproduced data signals through the means for removing spurious amplitude modulation.

24. A system as defined in claim 23 wherein said means for removing spurious amplitude modulation comprises a straight line equalizer.

25. A system as defined in claim 21 wherein said positionable element for mounting the magnetic head transducer has resonances and anti-resonances within its displacement response characteristic with fundamental resonant frequency lower than the lower-most anti-resonant frequency, the oscillation means providing oscillations at a frequency within a resonance region and outside an anti-resonance region.

26. A rotary segmental scan tape record and/or reproduce system for reproducing time modulated data signals recorded along separate tracks on magnetic tape comprising:

a magnetic head transducer for reproducing data signals recorded along a track on the magnetic tape;

a positionable element for mounting said transducer for displacement lateral to the track, said positionable element having resonances and anti-resonances within its displacement response characteristic with fundamental resonant frequency lower than the lower-most anti-resonant frequency;

oscillation means coupled to said positionable element to provide a continuous lateral oscillation of the position of said transducer about a bias position generally centered on said track as data signals are reproduced to thereby cause amplitude modulation of the envelope of the reproduced data signal, said oscillation means providing oscillation at a frequency within a resonance region and outside an anti-resonance region;

sensing means operatively associated with the transducer responsive to the amplitude modulation envelope of the reproduced data signal to generate a control signal indicative of the amplitude modulation of the envelope; and, servo means coupled between the sensing means and the positionable element for displacing the positionable element to adjust the bias position of the transducer in response to said control signal, said servo means being operable when said element is centered or on either side of said bias position, so that said servo means is generally continuously responsive to said control signal as said data signals along said track are reproduced.

27. A system as defined in claim 26 wherein said oscillation means provides oscillations at a frequency equal to an odd multiple of one half the rate at which tracks of recorded data signals are reproduced to minimize amplitude modulation interference that can be produced by harmonically related components of the rate at which said tracks are reproduced.

* * * * *